(12) United States Patent
Song et al.

(10) Patent No.: US 7,298,779 B2
(45) Date of Patent: Nov. 20, 2007

(54) FAST CODE ACQUISITION METHOD BASED ON SIGNED-RANK STATISTIC

(75) Inventors: Lick Ho Song, Yuseong-Gu (KR); Hong Gil Kim, Gunpo (KR); Chang Yong Jung, Cheongju (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 734 days.

(21) Appl. No.: 10/156,358

(22) Filed: May 28, 2002

(65) Prior Publication Data

US 2003/0223478 A1 Dec. 4, 2003

(51) Int. Cl.
*H04B 1/00* (2006.01)
*H04L 7/00* (2006.01)
*G06F 11/00* (2006.01)

(52) U.S. Cl. ............ 375/149; 375/240.26; 375/240.28; 375/150; 375/140; 375/367; 714/728; 714/731; 714/739

(58) Field of Classification Search ............ None
See application file for complete search history.

(56) References Cited

U.S. PATENT DOCUMENTS

| | | | | |
|---|---|---|---|---|
| 5,345,233 A | * | 9/1994 | Nagata et al. ............... | 341/76 |
| 5,509,035 A | * | 4/1996 | Teidemann et al. ......... | 375/356 |
| 6,963,727 B2 | * | 11/2005 | Shreve ........................ | 455/39 |
| 7,072,618 B1 | * | 7/2006 | Strutt ....................... | 455/67.13 |
| 2003/0193914 A1 | * | 10/2003 | Lomp et al. ................ | 370/335 |
| 2003/0202488 A1 | * | 10/2003 | Hsuan ........................ | 370/331 |
| 2004/0015670 A1 | * | 1/2004 | Chao ........................... | 711/167 |
| 2004/0109517 A1 | * | 6/2004 | Shin ........................... | 375/354 |
| 2005/0138510 A1 | * | 6/2005 | Terazawa ..................... | 714/726 |

* cited by examiner

*Primary Examiner*—David C. Payne
*Assistant Examiner*—Linda Wong
(74) *Attorney, Agent, or Firm*—Harness, Dicker & Pierce, PLC

(57) ABSTRACT

The present invention relates to the fast code acquisition methods based on signed-rank statistic. In more detail, it presents novel detectors required for PN (PN) code acquisition in DS/SS system.

In accordance with the present invention, first, the LOR (LOR) detector is derived and then the LSR (LSR) and MSR (MSR) detectors using approximate score functions are proposed. It is compared the single-dwell scheme without the verification mode using the proposed LSR and MSR detectors with that using the conventional squared-sum (SS) and modified sign (MS) detectors.

3 Claims, 2 Drawing Sheets

FAST CODE ACQUISITION METHOD BASED ON SIGNED-RANK STATISTIC

BACKGROUND OF THE INVENTION

1. Field of the Invention

The present invention relates to fast code acquisition methods based on signed-rank statistic. In more detail, it relates to novel detectors required for PN (PN) code acquisition in direct sequence spread spectrum (DS/SS) systems.

2. Description of the Related Art

When the receiver and transmitter in a DS/SS system start communicating each other, the local despreading PN code sequence should first be synchronized to the incoming spreading PN code sequence. The synchronization process is normally composed of two steps: code acquisition and tracking. The code acquisition is a process of successive decisions wherein the final goal is to bring the two code sequences into (at least) coarse time alignment within a fraction g of the chip duration $T_c$. After the successful code acquisition, a code tracking loop is used to synchronize the two code sequences even more accurately. In the present invention, the code acquisition problem is considered.

The basic unit in any acquisition receiver is a decision-making device; that is, a detector. The class of detectors can be classified as either coherent or noncoherent; according to the specific detection criteria, it can be classified into Bayes, Neyman-Pearson, and etc. In accordance with the present invention, the noncoherent Neyman-Pearson detector is considered.

In the conventional parametric detector, the variance of time-varying interference has to be estimated to decide the threshold of a detector. Small deviation of the estimated value from the real value, however, may lead to a significant performance degradation of the parametric detector. The nonparametric detector based on the sign statistic has been proposed recently for the PN code acquisition problem, whose threshold can be decided without first estimating the variance of interference.

Accordingly, it is therefore the object of the present invention to provide the novel nonparametric detectors, which may improve the performance of code acquisition system.

SUMMARY OF THE INVENTION

The present invention relates to the fast code acquisition methods based on signed-rank statistic. In more detail, it presents novel detectors required for PN code acquisition in DS/SS system.

In accordance with the present invention, first, the locally optimum rank (LOR) detector is derived and then the locally suboptimum rank (LSR) and modified signed-rank (MSR) detectors using approximate score functions are proposed. It is compared the single-dwell scheme without the verification mode using the proposed LSR and MSR detectors with that using the conventional squared-sum (SS) and modified sign (MS) detectors.

Accordingly, since the threshold is determined by a test statistic of a novel detector acquired by an approximation method based on signed-rank statistic in the present invention while the threshold of a conventional detector is determined by estimating variance of interference, the performance of detectors are improved, the estimation time for the variance of interference is eliminated, and an average time for pseudo-noise code acquisition is reduced so that the system performance may be improved.

DETAILED DESCRIPTION OF THE EMBODIMENTS

The foregoing subject of the present invention can be solved effectively. In the present invention, nonparametric detectors based on signed-rank statistic are used for PN code acquisition in DS/SS systems. We first derive the LOR (LOR) detector and then propose the LSR (LSR) and MSR (MSR) detectors using approximate score functions. We apply these detectors to the single-dwell scheme with the straight-serial strategy and then investigate the performance of the code acquisition system.

Hereinafter, referring to appended drawings, the structures and the operation procedures of the embodiments of the present invention are described in detail.

Figure 1:
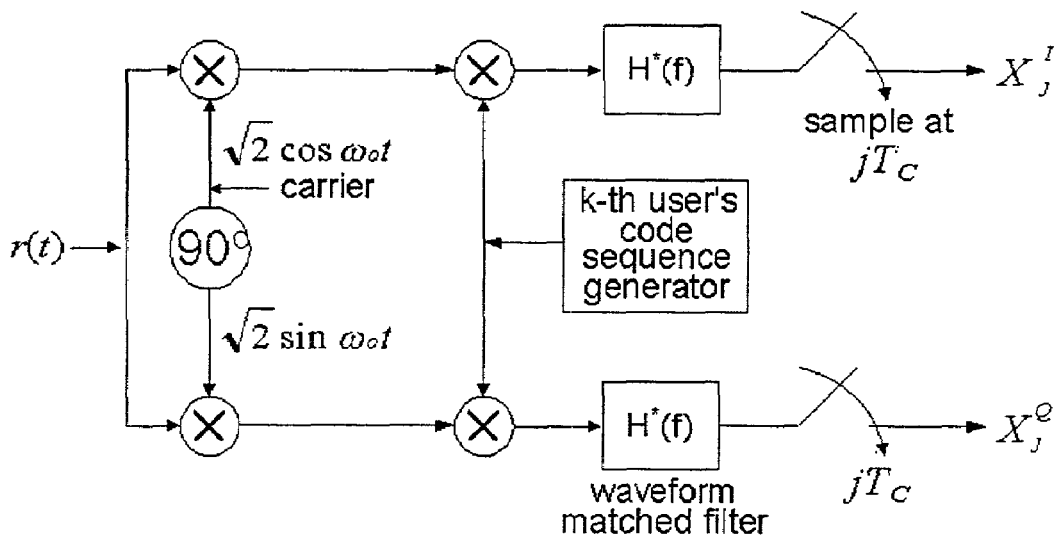
FIG. 1 is a block diagram illustrating the structure of the $k^{th}$ user's noncoherent BPSK (BiPhase-Shift Keying) demodulator.
Figure 2:
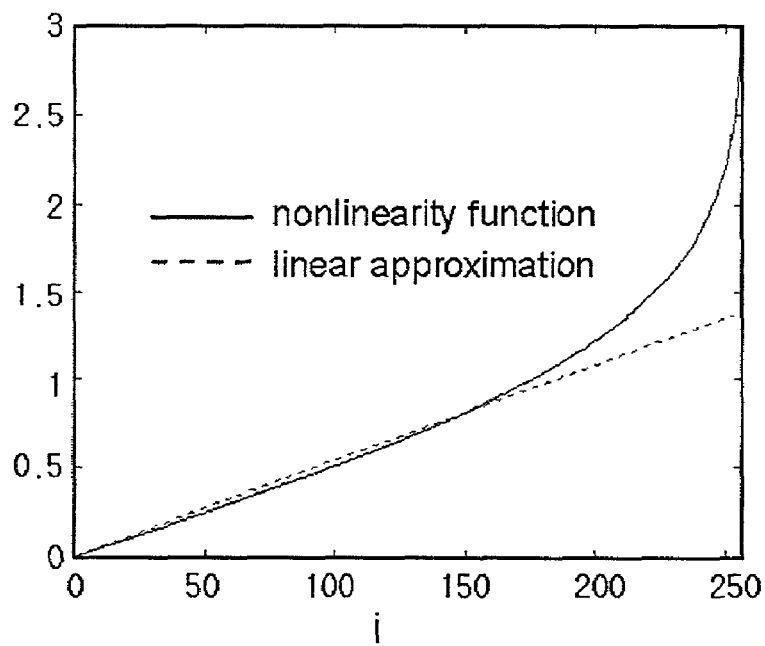
FIG. 2 is a graph showing the relationship between nonlinear function and linear approximation where n=256.
Figure 3:
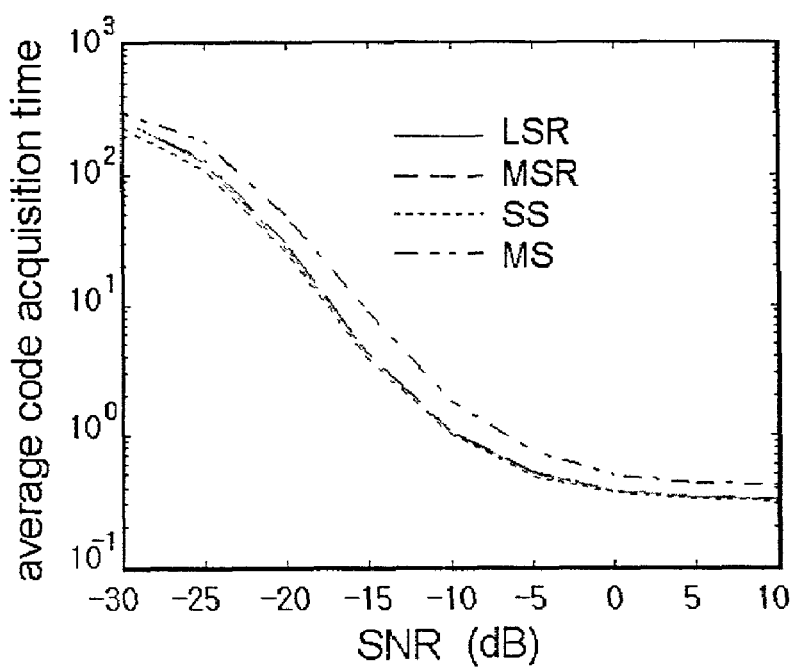
FIG. 3 is a graph showing the average code acquisition time as a function of the signal-to-noise ratio (SNR) in the noncoherent Rayleigh-faded reception case, when $P_{FA}=10^{-3}$, n=256, $K_u=10$.
Figure 4:
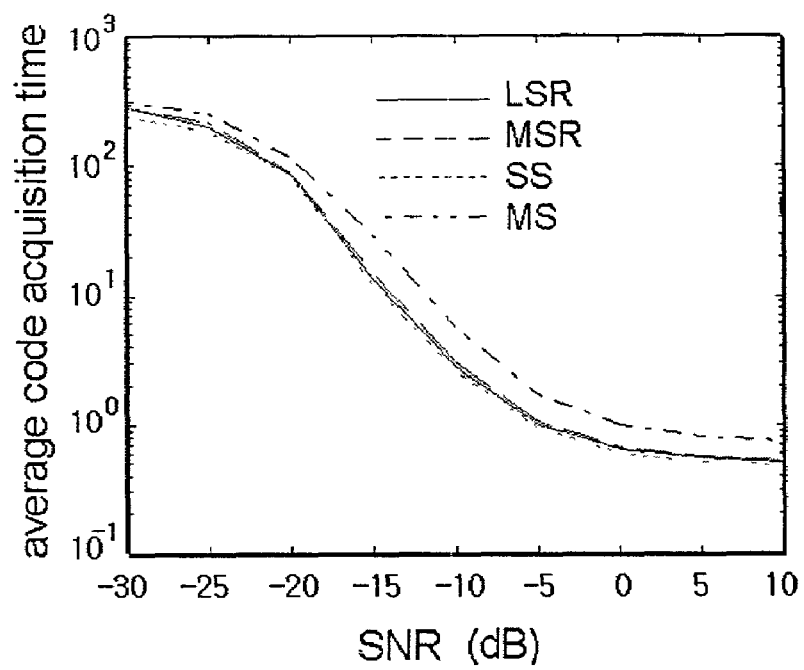
FIG. 4 is a graph showing the average code acquisition time as a function of the signal-to-noise ratio (SNR) in the noncoherent Rayleigh-faded reception case, when $P_{FA}=10^{-3}$, n=128, $K_u=10$

FIG. 1 is a block diagram illustrating the structure of the $k^{th}$ user's noncoherent BPSK (Biphase-Shift Keying) demodulator. FIG. 2 is a graph showing the relationship between nonlinear function and linear approximation where n=256. FIG. 3 is a graph showing the average code acquisition time as a function of the signal noise ratio in the noncoherent Rayleigh-faded reception case, when $P_{FA}=10^{-3}$, n=256, $K_u=10$, and FIG. 4 is a graph showing the average code acquisition time as a function of the signal noise ratio in the noncoherent Rayleigh-faded reception case, when $P_{FA}=10^{-3}$, n=128, $K_u=10$.

When the Doppler shift and fading effects are ignored, the received signal r(t) can be described by $$r(t) = \sum_{i=1}^{K_u} \sqrt{2E_i}\, c_i(t - \tau_i T_c)\cos(\omega_0 t + \phi_i) + n(t) \quad \text{[Equation 1]}$$

In Equation 1, $K_u$ is the number of users and $E_i$ is the $i^{th}$ user's energy per chip.

$$c_i = \frac{1}{\sqrt{T_c}} \sum_{n=-\infty}^{\infty} a_i(n)[U(t) - U(t - T_c)] \quad \text{[Equation 2]}$$

is the $i^{th}$ user's PN code sequence; $T_c$ is the chip duration; $\tau_i$ is the time delay of the incoming $i^{th}$ user's spreading PN code sequence divided by $T_c$; $\omega_0$ is the carrier angular frequency; $\phi_i$ is the $i^{th}$ user's unknown phase uniformly distributed over [0,2π); and n(t) is the additive white Gaussian noise (AWGN) with mean zero and variance $\sigma_0^2/2$. In Equation 2, $a_i(n)$ is the $i^{th}$ user's PN sequence value at the $n^{th}$ chip time, where $a_i(n)\in\{-1,+1\}$, and U(t) is the unit step function, whose value is +1 if t≧0 and 0 otherwise. In present invention, it is assumed that the first user is the desired user and g=1.

The $j^{th}$ sampled inphase and quadrature components shown in FIG. 1 can be expressed as $$X_j^I = \int_j^{j-T_c} r(t)c_1(t-\hat{\tau}_1 T_c)\sqrt{2}\cos\omega_0 t dt \qquad \text{[Equation 3]}$$

$$X_j^Q = \int_j^{j-T_c} r(t)c_1(t-\hat{\tau}_1 T_c)\sqrt{2}\sin\omega_0 t dt \qquad \text{[Equation 4]}$$

respectively, where $\hat{\tau}_1$ is the time delay of the locally generated despreading PN sequence divided by $T_c$ and $t_j=t_0+jT_c$. Here, $t_0$ is the initial time and j is an integer.

Now we consider the PN code acquisition problem. Consider the real straight-serial PN code acquisition scheme without the verification mode. Using the PN code sequence locally generated, we obtain the inphase and quadrature channel data $X_j^I$ and $X_j^Q$, j=1,2, . . . n, evaluate a test statistic, and then compare the value of the test statistic to the threshold. Here, n is the partial correlation period. If the value of the test statistic is greater than the threshold, we decide that the locally generated PN sequence is synchronized to the incoming PN code sequence within $T_c$: the acquisition mode is completed and the tracking mode is started. Otherwise, the local PN code sequence is left shifted by $T_c$ and we repeat the above procedure. The searching job will continue till the value of the test statistic is greater than the threshold. When the code tracking fails, the searching job will start again.

From the above description, it is clear that we can regard the PN code acquisition problem as a binary hypothesis testing problem: given two observation vectors $X^I=(X_1^I,X_2^I, \ldots ,X_n^I)$ and $X^Q=(X_1^Q,X_2^Q, \ldots , X_n^Q)$, a decision is to be made between the null hypothesis H and alternative hypothesis K, where $$H: |\tau_1-\hat{\tau}_1| \geq T_c \qquad \text{[Equation 5]}$$

and $$K: |\tau_1-\hat{\tau}_1| < T_c \qquad \text{[Equation 6]}$$

We can alternatively express the null and alternative hypotheses using the statistics of $X_j^I$ and $X_j^Q$ $$H:(X_j^I=W_j^I, X_j^Q=W_j^Q), j=1,2, \ldots ,n \qquad \text{[Equation 7]}$$

and $$K:(X_j^I=\theta \cos\phi+W_j^I, X_j^Q=-\theta\sin\phi+W_j^Q), j=1,2, \ldots ,n \qquad \text{[Equation 8]}$$

In Equation 7 and Equation 8, $$\theta = \frac{\sqrt{E_1}}{2}$$

is the signal strength parameter, $\phi=\phi_1$, and $W_j^I$ and $W_j^Q$ are the uncorrelated inphase and quadrature interference components, respectively, with the common probability density function $f_w=N(0,\sigma_W^2)$. Here, $N(m,\sigma^2)$ denotes the normal probability density function with mean m and variance $\sigma^2$, and $$\sigma_W^2 = \frac{1}{3}\sum_{i=2}^{K_u} E_i + \frac{\sigma_0^2}{2}.$$

The derivation of the statistics of $X_j^I$ and $X_j^Q$ will be discussed later.

The problem can be thought as the following parameter hypothesis problem, because the null hypothesis is the special case, ($\theta=0$), of the alternative hypothesis:

$$H:\theta=0 \qquad \text{[Equation 9]}$$

and $$K:\theta>0 \qquad \text{Equation [10]}$$

For given $(X_j^I,X_j^Q)=(x_j^I,x_j^Q)$, let $f(\theta;j)$ be the joint probability density function of $X_j^I$ and $X_j^Q$ as a function of $\theta$.

$$f(\theta; j) = f_W(x_j^I - \theta\cos\phi)f_W(x_j^Q + \theta\sin\phi) = \qquad \text{[Equation 11]}$$
$$\frac{1}{2\pi\sigma_W^2}\exp\left(\frac{-(x_j^I - \theta\cos\phi)f_W(x_j^Q + \theta\sin\phi)^2}{2\sigma_W^2}\right)$$

The joint probability density function of the 2n sampled inphase and quadrature observations $\{X_j^I,X_j^Q\}$, i=1, . . . n, is then $$f_{X^I,X^Q}(x^I, x^Q) = E_\phi\left\{\prod_{j=1}^n f(\theta; j)\right\} \qquad \text{[Equation 12]}$$

under the assumption that the samples $(X_j^I,X_j^Q)$ of the bivariate observation process form a sequence of independent random vectors for given $\phi$. In Equation 12, $E_\phi$ denotes the expectation over $\phi$.

Further, to derive detection schemes based on signs and ranks only of the observations, let $Z^I=(Z_1^I,Z_2^I, \ldots ,Z_n^I)$ be the vector of signs $Z_j^I=\text{sgn}(X_j^I)$, and let $Q^I=(Q_1^I,Q_2^I, \ldots ,Q_n^I)$ be the magnitude rank vector with $Q_n^I$ being the rank of $|X_j^I|$ in the set $|X^I|=\{|X_1^I|,|X_2^I|, \ldots ,|X_n^I|\}$. Here, sgn(x) is the sign function, whose value is +1, if $x \geq 0$ and −1, otherwise. We will also use $|X^I|_{[j]}$ to denote the $j^{th}$ smallest member of the set $|X^I|$. We define $Z^Q$, $Q^Q$, and $|X^Q|_{[j]}$ in a similar manner.

Let $p(q^I,q^Q,z^I,z^Q|H)$ and $p(q^I,q^Q,z^I,z^Q|K)$ be the discrete probability mass functions of $Q^I,Q^Q,Z^I$, and $Z^Q$ jointly under H and K, respectively. Then $$H:p(q^I, q^Q, z^I, z^Q | H) \qquad \text{[Equation 13]}$$
$$= Pr\{Q^I = q^I, Q^Q = q^Q, Z^I = z^I, Z^Q = z^Q | H\}$$
$$= \frac{1}{(2^n n!)^2}$$

and $$K:p(q^I, q^Q, z^I, z^Q | K) = \int_B f_{X^I,X^Q}(x^I, x^Q) dx^I dx^Q \qquad \text{[Equation 14]}$$

where $B=\{(x^I,x^Q)|Q^I=q^I,Q^Q=q^Q,Z^I=z^I,Z^Q=z^Q\}$. Applying the generalized version of the Neyman-Pearson's fundamental lemma, we get the test statistic of the LOR detector as the ratio $$T_{LOR} = \frac{1}{p(q^I, q^Q, z^I, z^Q | H)} \lim_{\phi \to 0} \frac{d^\nu p(q^I, q^Q, z^I, z^Q | K)}{d\theta^\nu} \quad \text{[Equation 15]}$$

where $\nu$ is the first nonzero derivative of $p(q^I,q^Q,z^I,z^Q|K)$ at $\theta=0$.

Using Equation 13 through Equation 15, it can be shown that the test statistic of the LOR detector is

[Equation 16]

$$T_{LOR}(X^I, X^Q) = \frac{1}{2}\sum_{i=1}^{n}\{d(Q_i^I) + d(Q_i^Q)\} + \frac{1}{2}\sum_{i=1}^{n}\sum_{j\neq i}^{n} Z_i^I Z_j^Q \{c(Q_i^I, Q_j^I) + c(Q_i^Q, Q_j^Q)\} \quad \text{[Equation 16]}$$

where $$c(Q_i^I, Q_j^I) = E_H\{g(|X^I|_{[i]})g(|X^I|_{[j]})\} \quad \text{[Equation 17]}$$

and $$d(Q_i^I) = E_H\{h(|X^I|_{[i]})\} \quad \text{[Equation 18]}$$

with $$h(x) = \frac{f_W''(x)}{f_W(x)} \text{ and } g(x) = -\frac{f_W'(x)}{f_W(x)}.$$

The proof of the result Equation 16 will be given later.

For the Gaussian probability density function, the values of the score functions $c(i,j)$ and $d(i)$ cannot be obtained analytically. Although methods of numerical analysis can be used to obtain the values, we may instead use asymptotic approximations to the score functions. The approximate score functions $\tilde{c}(i,j)$ and $\tilde{d}(i)$ are $$\tilde{c}(i, j) \approx \Phi^{-1}\left(\frac{n+i+1}{2n+2}\right)\Phi^{-1}\left(\frac{n+j+1}{2n+2}\right) \quad \text{[Equation 19]}$$

and $\tilde{d}(i) \approx \left\{\Phi^{-1}\left(\frac{n+i+1}{2n+2}\right)\right\}^2 - 1$ [Equation 20]

where $\Phi$ is the standard normal cumulative distribution function (cdf). With the approximate score functions, the LSR detector can be constructed. After the appropriate substitutions of Equation 19 and Equation 20 into Equation 16 and some manipulations, we have $$T_{LSR}(X^I, X^Q) = \left[\sum_{i=1}^{n} Z_i^I \Phi^{-1}\left(\frac{n+Q_i^I+1}{2n+2}\right)\right]^2 + \left[\sum_{i=1}^{n} Z_i^Q \Phi^{-1}\left(\frac{n+Q_i^Q+1}{2n+2}\right)\right]^2 \quad \text{[Equation 21]}$$

as the test statistic of the LSR detector. From FIG. 2, it is clear that the nonlinearity function $$\Phi^{-1}\left(\frac{n+i+1}{2n+2}\right)$$

can be approximated by a straight line when i is not too close to n. Thus, we consider a modification of the test statistic Equation 21. When we use i instead of $$\Phi^{-1}\left(\frac{n+i+1}{2n+2}\right)$$

in Equation 21, we obtain the test statistic of the MSR detector as $$T_{MSR}(X^I, X^Q) = \left(\sum_{i=1}^{n} Z_i^I Q_i^I\right)^2 = \left(\sum_{i=1}^{n} Z_i^Q Q_i^Q\right)^2 \quad \text{[Equation 22]}$$

Once we get $T_m(X^I,X^Q)$, m=LOR, LSR, and MSR, we can then determine the threshold $\lambda_m$ and randomization parameter $\gamma_m$ to satisfy $$Pr\{T_m(X^I,X^Q) > \lambda_m | H\} \leq P_{FA} \quad \text{[Equation 23]}$$

and $$\gamma_m = \frac{P_{FA} - Pr\{T_m(X^I, X^Q) > \lambda_m | H\}}{Pr\{T_m(X^I, X^Q) = \lambda_m | H\}} \quad \text{[Equation 24]}$$

where $\lambda_m \geq 0$, $0 \leq \gamma_m < 1$, and $P_{FA}$ is the false alarm probability. Thus, using Equation 23 and Equation 24, the detection probability is $$P_{D,m} = Pr\{T_m(X^I,X^Q) > \lambda_m | K\} + \gamma_m Pr\{T_m(X^I,X^Q) = \lambda_m | K\} \quad \text{[Equation 25]}$$

Now we consider the effect of Rayleigh fading. We assume that the Ryleigh fading is slow enough so that the amplitude as well as the phase remains constant over n chip times but fast enough so that successive n chip segments are essentially independent. In the null hypothesis, the test statistic is the same as that in the unfaded case. We can thus use the same threshold and randomization parameter as in the unfaded case. Then we can get the average detection probability $$\overline{P_D} = \int_0^\infty p(\alpha) P_{D,m} d\alpha, \text{ where } p(\alpha) = \frac{\alpha}{\sigma_R^2} \exp^{-\frac{\alpha^2}{2\sigma_R^2}}$$

is the probability density function of the Rayleigh fading.

In here, we compare the single-dwell scheme without the verification mode using the proposed detectors with that using the conventional detector. As the performance measure, we use the time elapses prior to acquisition, which will be called the code acquisition time $T_{acq}$. When the timing error is uniformly distributed, the average code acquisition time of the single-dwell scheme without the verification mode is $$E\{T_{acq}\} = \left\{1 + (1 + KP_{FA})\left(\frac{L-1}{2}\right)(2 - P_D)\right\}t_d / P_D \quad \text{[Equation 26]}$$

where K is the penalty time factor; L is the code sequence length; and $t_d$ is the dwell time per cell in the search mode. The simulation conditions are as follows.

Search mode: straight-serial.
Chip duration: $T_c$=1 μs.
Dwell time per cell: $t_d$=1 μs.
Code sequence length: L=32767 chips.
Partial correlation length: n=128 or 256 chips.
Timing error $|\tau_1 - \hat{\tau}_1|$: uniformly distributed over (−32767 μs, 32767 μs).
Penalty time factor: K=$10^4$.
Normalized residual shift $\delta_1$: uniformly distributed over (−1,+1).

We consider the noncoherent reception of Rayleigh-faded signals in AWGN. We assume that $E_i = E_j$ for all i and j, and $\sigma_R^2 = 1$. We use the squared-sum (SS) detector as the conventional parametric detector, the modified sign (MS) detector as the conventional nonparametric detector, and the LSR and MSR detectors as the proposed nonparametric detectors. For the SS and MS detectors, the test statistics are given by $$T_{SS}(X^I, X^Q) = \left(\sum_{i=1}^{n} X_i^I\right)^2 + \left(\sum_{i=1}^{n} X_i^Q\right)^2 \quad \text{[Equation 27]}$$

$$\text{and } T_{MS}(X^I, X^Q) = \left(\sum_{i=1}^{n} Z_i^I\right)^2 + \left(\sum_{i=1}^{n} Z_i^Q\right)^2 \quad \text{[Equation 28]}$$

respectively.

FIG. 3 shows the average code acquisition time as a function of the SNR in the noncoherent Rayleigh-faded reception case, when $P_{FA}=10^{-3}$, n=$256$, and $K_u$=10. The number of Monte Carlo runs for each point is 100000. In FIG. 3, the solid, dashed, dotted, and dashdot lines represent the LSR, MSR, Ss, and MS detectors, respectively. We assume that the variance of interference is known a priori in the SS detector case. The SS detector has the best performance among the detectors compared, because it is the optimum detector in AWGN. The proposed LSR and MSR detectors perform better than the MS detector by about 2-3 dB and are nearly optimum.

FIG. 4 shows the average code acquisition time as a function of the SNR in the noncoherent Rayleigh-faded reception case, when $P_{FA}=10^{-3}$, n=128, and $K_u$=10. The other conditions are the same as those of FIG. 3. The performance of the detectors shows a tendency quite similar to that in FIG. 3. A main difference is that the code acquisition time in FIG. 4 (n=128) is greater than that in FIG. 3 (n=256): the detection probability decreases, as the partial correlation period (that is, the sample size) decreases.

Here, the derivation of the statistics of $X_j^I$ and $X_j^Q$ is discussed.

First of all, we consider the statistic of $X_j^I$. We can easily rewrite the $j^{th}$ sampled inphase component $$X_j^I = \alpha_j + \beta_j \gamma_j \quad \text{[Equation 29]}$$

where $$\alpha_j = \sqrt{E_1} \cos \phi_1 \int_{t_j}^{t_j - T_c} c_1(t - \tau_1 T_c) c_1(t - \hat{\tau}_1 T_c) dt \quad \text{[Equation 30]}$$

is the desired signal component including the interchip interference effect $$\beta_j = \sum_{i=2}^{K_u} \sqrt{E_i} \cos\phi_i \int_{t_j}^{t_j - T_c} c_i(t - \tau_i T_c) c_1(t - \hat{\tau}_1 T_c) dt \quad \text{[Equation 31]}$$

is the multiple access interference component, and $$\gamma_j = \sqrt{2} \int_{t_j}^{t_j - T_c} n(t) c_1(t - \hat{\tau}_1 T_c) \cos \omega_0 t \, dt \quad \text{[Equation 32]}$$

is the additive noise component.

After some manipulations, we can show that the means and variances of $\alpha_j$ under the null and alternative hypotheses are $$E\{\alpha_j|H\}=0 \quad \text{[Equation 33]}$$

$$E\{\alpha_j|K\}=\sqrt{E_1}(1-|\delta_1|)\cos \phi_1 \quad \text{[Equation 34]}$$

$$Var\{\alpha_j|H\}=E_1(1-2|\delta_1|+2\delta_1^2)\cos^2\phi_1 \quad \text{[Equation 35]}$$

and $$Var\{\alpha_j|K\}=E_1\delta_1^2 \cos^2\phi_1 \quad \text{[Equation 36]}$$

Here, $\delta_i$ is the $i^{th}$ user's normalized residual shift defined as $$\delta_i = \frac{\tau_i - \hat{\tau}_1}{T_c} - \left\lfloor \frac{\tau_i - \hat{\tau}_1}{T_c} \right\rfloor$$

and ranges in the interval (−1, +1).

We can similarly get the means and variances of $\beta_j$ and $\gamma_j$ under the null and alternative hypotheses $$E\{\beta_j|H\}=E\{\beta_j|K\}=0 \quad \text{[Equation 37]}$$

$$Var\{\beta_j|H\} = Var\{\beta_j|K\} = \sum_{i=2}^{K_u} E_i(1 - 2|\delta_i| + 2\delta_i^2)\cos^2\phi_i \quad \text{[Equation 38]}$$

$$E\{\gamma_j|H\}=E\{\gamma_j|K\}=0 \quad \text{[Equation 39]}$$

and $$Var\{\gamma_j|H\} = Var\{\gamma_j|K\} = \frac{\sigma_0^2}{2} \quad \text{[Equation 40]}$$

Taking the expectation of Equation 33 through Equation 40 over $\delta_i$ and $\phi_i$ (except $\phi_1$), we can obtain the means and variances of $X_j^I$ under the null and alternative hypotheses:

$$E\{X_j^I|H\}=0 \quad \text{[Equation 41]}$$

$$E\{X_j^I|K\} = \frac{1}{2}\sqrt{E_1} \cos\phi_1 \quad \text{[Equation 42]}$$

$$\text{Var}\{X_j^I|H\} = \frac{1}{3}\sum_{i=2}^{K_u} E_i + \frac{\sigma_0^2}{2} \qquad \text{[Equation 43]}$$

and $$\text{Var}\{X_j^I|K\} = \frac{1}{6}E_1 + \frac{1}{3}\sum_{i=2}^{K_u} E_i + \frac{\sigma_0^2}{2} \qquad \text{[Equation 44]}$$

For the time being, we keep $\phi_1$. We assume that $\alpha_j$, $\beta_j$, and $\gamma_j$ are mutually independent random variables. If $K_u \gg 1$ and $E_i$ is not quite different from $E_j$ for all i and j $$\left(\text{so that } \frac{1}{3}\sum_{i=2}^{K_u} E_i \gg \frac{1}{3}E_1 > \frac{1}{6}E_1\right),$$

we have $$\text{Var}\{X_j^I|K\} \approx \text{Var}\{X_j^I|H\} \approx \frac{1}{3}\sum_{i=2}^{K_u} E_i + \frac{\sigma_0^2}{2}.$$

That is, we ignore the interchip interference effect in present invention.

We can obtain the means and variances of $X_j^Q$ under the null and alternative hypotheses similarly $$E\{X_j^Q|H\} = 0$$

$$E\{X_j^Q|K\} = -\frac{1}{2}\sqrt{E_1}\sin\phi_1 \qquad \text{[Equation 46]}$$

and

-continued $$\text{Var}\{X_j^Q|K\} \approx \text{Var}\{X_j^Q|H\} \approx \frac{1}{3}\sum_{i=2}^{K_u} E_i + \frac{\sigma_0^2}{2} \qquad \text{[Equation 47]}$$

Further, the derivation of the LOR detector test statistics is discussed.

The first derivative of $p(q^I,q^Q,z^I,z^Q|K)$ at $\theta=0$ vanishes identically, as follows:

$$\lim_{\theta \to 0} \frac{d\, p(q^I, q^Q, z^I, z^Q|K)}{d\theta} \int_B \lim_{\theta \to 0} \frac{d f_{X^I X^Q}(x^I, x^Q)}{d\theta} dx^I dx^Q = \qquad \text{[Equation 48]}$$

$$\int_B E_\phi\left\{\sum_{i=1}^n f'(0;i)\prod_{j\neq 1}^n f(0;j)\right\}dx^I dx^Q$$

where $$E_\phi\{f'(0;i)\} = E_\phi\left(-\cos\phi \frac{df(0;i)}{dx_i^I} + \sin\phi \frac{df(0;i)}{dx_i^Q}\right) = 0 \qquad \text{[Equation 49]}$$

We thus obtain the second derivative of $p(q^I,q^Q,z^I,z^Q|K)$ at $\theta=0$ $$\lim_{\theta \to 0} \frac{d^2 p(q^I, q^Q, z^I, z^Q|K)}{d\theta^2} = \qquad \text{[Equation 50]}$$

$$\int_B \lim_{\theta \to 0} \frac{d^2 f_{X^I X^Q}(x^I, x^Q)}{d\theta^2} dx^I dx^Q =$$

$$\int_B E_\phi\left\{\sum_{i=1}^n f''(0;i)\prod_{j\neq 1}^n f(0;j) + f'(0;i)\sum_{j\neq 1}^n f'(0;j)\prod_{k\neq j,k\neq i}^n f(0;k))\right\}dx^I dx^Q$$

Noting that $$f''(0;i) = \cos^2\phi \frac{d^2 f(0;i)}{dx_i^{I^2}} + \sin^2\phi \frac{d^2 f(0;i)}{dx_i^{Q^2}} - \sin\phi\cos\phi \frac{d^2 f(0;i)}{dx_i^I dx_j^Q} - \cos\phi\sin\phi \frac{d^2 f(0;i)}{dx_i^Q dx_j^I} \qquad \text{[Equation 51]}$$

the first integrand of Equation 50 is $$E_\phi\left\{\sum_{i=1}^n f''(0;i)\prod_{j\neq 1}^n f(0;j)\right\} = \qquad \text{[Equation 52]}$$

$$\frac{1}{2}\sum_{i=1}^n \{h(x_i^I) + h(x_i^Q)\}\prod_{j=1}^n f(0;j)$$

where $$h(x) = \frac{f_W''(x)}{f_W(x)} \qquad \text{[Equation 53]}$$

Similarly, noting that $$f'(0;i)f'(0;j) = \cos^2\phi \frac{df(0;i)}{dx_i^I}\frac{df(0;j)}{dx_j^I} + \sin^2\phi \frac{df(0;i)}{dx_i^Q}\frac{df(0;j)}{dx_j^Q}$$
$$-\sin\phi\cos\phi\frac{df(0;i)}{dx_i^I}\frac{df(0;j)}{dx_j^Q} - \cos\phi\sin\phi\frac{df(0;i)}{dx_i^Q}\frac{df(0;j)}{dx_j^I}$$

[Equation 54]

the second integrand of Equation 50 is $$E_\phi\left\{\sum_{i=1}^n\sum_{j\neq 1}^n f'(0;i)f'(0;j)\prod_{k\neq j,k\neq 1}^n f(0;k)\right\} =$$
$$\frac{1}{2}\sum_{i=1}^n\sum_{j\neq 1}^n [g(x_i^I)g(x_j^I) + g(x_i^Q)g(x_j^Q)]\prod_{k=1}^n f(0;k)$$

[Equation 55]

where $$g(x) = -\frac{f'_W(x)}{f_W(x)}$$

[Equation 56]

Using Equation 50, Equation 52, and Equation 55, $g(x) = sgn(x)g(|x|)$, and $h(|x|) = h(x)$, we have $$\lim_{\theta\to 0}\frac{d^2 p(q^I, q^Q, z^I, z^Q | K)}{d\theta^2} =$$

[Equation 57]

$$\frac{1}{2}\sum_{i=1}^n \int_B \{h(x_i^I) + h(x_i^Q)\}\prod_{j=1}^n f(0;j)dx^I dx^Q +$$
$$\frac{1}{2}\sum_{i=1}^n\sum_{j\neq 1}^n \int_B \{g(x_i^I)g(x_j^I)\}\prod_{k=1}^n f(0;k)dx^I dx^Q +$$
$$\frac{1}{2}\sum_{i=1}^n\sum_{j\neq 1}^n \int_B \{g(x_i^Q)g(x_j^Q)\}\prod_{k=1}^n f(0;k)dx^I dx^Q =$$
$$\frac{1}{2}\sum_{i=1}^n \int_B \{h(|x_i^I|) + h(|x_i^Q|)\}\prod_{j=1}^n f(0;j)dx^I dx^Q +$$
$$\frac{1}{2}\sum_{i=1}^n\sum_{j\neq 1}^n \int_B Z_i^I Z_j^I g(|x_i^I|)g(|x_j^I|)\prod_{k=1}^n f(0;k)dx^I dx^Q +$$
$$\frac{1}{2}\sum_{i=1}^n\sum_{j\neq 1}^n \int_B Z_i^Q Z_j^Q g(|x_i^Q|)g(|x_j^Q|)\prod_{k=1}^n f(0;k)dx^I dx^Q =$$
$$\frac{1}{2(2^n n!)^2}\sum_{i=1}^n \{d(Q_i^I) + d(Q_i^Q)\} +$$
$$\frac{1}{2(2^n n!)^2}\sum_{i=1}^n\sum_{j\neq 1}^n Z_i^I Z_j^Q \{c(Q_i^I, Q_j^I) + c(Q_i^Q, Q_j^Q)\}$$

Dividing Equation 57 by $p(q^I,q^Q,z^I,z^Q|H)=(2^n n!)^{-2}$, we get Equation 16.

What is claimed is:

1. A fast code acquisition method comprising the steps of:
preparing a locally optimum rank (LOR) detector;
determining test statistics of the LOR detector based on signed-rank statistics according to the following equations:

$$T_{LOR}(X^I, X^Q) = \frac{1}{2}\sum_{i=1}^n \{d(Q_i^I) + d(Q_i^Q)\} + \frac{1}{2}\sum_{i=1}^n\sum_{j\neq 1}^n Z_i^I Z_j^Q \{c(Q_i^I, Q_j^I) + c(Q_i^Q, Q_j^Q)\}$$

where $c(Q_i^I, Q_j^I) = E_H\{g(|X^I|_{[i]})g(|X^I|_{[j]})\}$, $d(Q_i^I) = E_H\{h(|X^I|_{[i]})\}$, and $$h(x) = \frac{f''_w(x)}{f_w(x)} \quad g(x) = -\frac{f'_w(x)}{f_w(x)}$$

wherein $X^I$, $X^Q$ are inphase and quadrature channel data, n is an integer, $Z^I=sgn(X^I)$, and $Z^Q=sgn(X^I)$, both are vectors of signs of the inphase and quadrature channel data, $Q^I$, $Q^Q$ are magnitude rank vectors of the inphase and quadrature channel data, and $f_W(x)$ is the common probability density function, acquiring a code utilizing the test statistics of the LOR detector.

2. A fast code acquisition method in accordance with claim 1, further comprising the steps of:
preparing a locally suboptimum rank (LSR) detector;
determining test statistics of the LSR detector according to the following equation:

$$T_{LSR}(X^I, X^Q) = \left[\sum_{i=1}^n Z_i^I \Phi^{-1}\left(\frac{n+Q_i^I+1}{2n+2}\right)\right]^2 + \left[\sum_{i=1}^n Z_i^Q \Phi^{-1}\left(\frac{n+Q_i^Q+1}{2n+2}\right)\right]^2$$

wherein $\Phi$ is the standard normal cumulative distribution function (cdf), $X^I$, $X^Q$ are inphase and quadrature channel data, n is an integer, $Z^I=sgn(X^I)$, and $Z^Q=sgn(X^Q)$, both are vectors of signs of the inphase and quadrature channel data, and $Q^I$, $Q^Q$ are magnitude rank vectors of the inphase and quadrature channel data;

acquiring the code utilizing the test statistics of the locally suboptimum rank (LSR) detector by using approximate score functions.

3. A fast code acquisition method in accordance with claim 2, further comprising steps of:
preparing a modified signal-rank (MSR) detector;
determining test statistics of the MSR detector according to the following equation:

$$T_{MSR}(X^I, X^Q) = \left(\sum_{i=1}^{n} Z_i^I Q_i^I\right)^2 + \left(\sum_{j=1}^{n} Z_j^Q Q_j^Q\right)^2$$

wherein $X^I$, $X^Q$ are inphase and quadrature channel data, n is an integer, $Z^I = \text{sgn}(X^I)$, and $Z^Q = \text{sgn}(X^Q)$, both are vectors of signs of the inphase and quadrature channel data, and $Q^I$, $Q^Q$ are magnitude rank vectors of the inphase and quadrature channel data;

acquiring the code utilizing the test statistics of the modified signed-rank (MSR) detector by an approximation method.

* * * * *